US008413560B2

(12) United States Patent
Liao

(10) Patent No.: US 8,413,560 B2
(45) Date of Patent: Apr. 9, 2013

(54) QUICK-RELEASE APPARATUS FOR KNIFE PLATE OF SAW GRINDING MACHINE

(76) Inventor: Hui-Lan Liao, Dali (TW)

(*) Notice: Subject to any disclaimer, the term of this patent is extended or adjusted under 35 U.S.C. 154(b) by 558 days.

(21) Appl. No.: 12/785,614

(22) Filed: May 24, 2010

(65) Prior Publication Data

US 2011/0056358 A1 Mar. 10, 2011

(30) Foreign Application Priority Data

Sep. 10, 2009 (CN) ...................... 2009 2 0169519 U

(51) Int. Cl.
*B23B 19/00* (2006.01)

(52) U.S. Cl.
USPC ....................................... 83/102.1; 83/689.11

(58) Field of Classification Search ................. 83/102.1, 83/698.11, 440.2
See application file for complete search history.

(56) References Cited

U.S. PATENT DOCUMENTS

| | | | | |
|---|---|---|---|---|
| 1,118,477 | A * | 11/1914 | Davis | 83/860 |
| 4,721,023 | A * | 1/1988 | Bartlett et al. | 83/100 |
| 4,805,505 | A * | 2/1989 | Cantlin | 83/468.6 |
| 5,287,780 | A * | 2/1994 | Metzger et al. | 83/102.1 |
| 6,840,144 | B2 * | 1/2005 | Huang | 83/102.1 |
| 7,437,981 | B2 * | 10/2008 | Burke et al. | 83/102.1 |
| 7,540,223 | B2 * | 6/2009 | Sasaki et al. | 83/102.1 |
| 7,621,204 | B2 * | 11/2009 | Merhar et al. | 83/13 |
| 8,096,220 | B2 * | 1/2012 | Weir et al. | 83/478 |
| 8,272,305 | B2 * | 9/2012 | Xu et al. | 83/102.1 |
| 2006/0260456 | A1 * | 11/2006 | Chang | 83/477.2 |
| 2007/0074613 | A1 * | 4/2007 | Yu | 83/581 |
| 2007/0113714 | A1 * | 5/2007 | Burke et al. | 83/102.1 |
| 2010/0319509 | A1 * | 12/2010 | Chuang | 83/102.1 |
| 2011/0017037 | A1 * | 1/2011 | Xu et al. | 83/102.1 |
| 2011/0179923 | A1 * | 7/2011 | Tsuda et al. | 83/100 |

FOREIGN PATENT DOCUMENTS

| | | | |
|---|---|---|---|
| CN | 201120639 | Y | 9/2008 |

* cited by examiner

*Primary Examiner* — Sean Michalski
(74) *Attorney, Agent, or Firm* — Alan Kamrath; Kamrath IP Lawfirm, P.A.

(57) ABSTRACT

A quick-release apparatus which is adapted for a knife board of a saw grinding machine comprises a fixture plate forming with a first projection; wherein the knife board includes a coupled portion having a slot to hook the first projection; a fastening member mounted onto and not pivot with respect to the first projection of the fixture plate and including an exterior side having at least one concaved portion; and a control member pivotably connected to the fastening member and including an abutted side and at least one protruding portion formed on the abutted side, with the abutted side and the at least one protruding portion both corresponding to the at least one concaved portion, with the abutted side facing the fastening member, and with the at least one protruding portion selectively pressing the exterior side of the fastening member to tightly attach to the knife plate.

11 Claims, 15 Drawing Sheets

QUICK-RELEASE APPARATUS FOR KNIFE PLATE OF SAW GRINDING MACHINE

BACKGROUND OF THE INVENTION

1. Field of the Invention

The present invention relates to a quick-release apparatus for a knife plate of a saw grinding machine and, more particularly, to a quick-release apparatus used for and selectively abutted against a knife plate of a saw grinding machine.

2. Description of the Related Art

Disclosed in China Patent Publication No. 200720182884.2 is an adjustable apparatus for a saw grinding machine. The apparatus includes a base member, a cutting board and a fixture unit. A slot is longitudinally formed on the cutting board and corresponds to a positioned hole of the base member. A limited slot is formed longitudinally on the cutting board and corresponds to a limited element of the base member. The limited slot is limited to be disposed at the limited element as to position the cutting board via the limited element. And the cutting board is able to longitudinally slide along the limited slot on the base member. After finishing adjusting the height of the cutting board with respect to the base member, the cutting board is fixed onto a fixed hole of the base member by the fixture unit.

However, to detach the cutting board from the base member, because the fixture unit is in form of hexagonal nut, it needs to use a suitable hand tool to detach the hexagonal nut. So that detachment of the fixture unit from the cutting board is inconvenient and wastes time.

SUMMARY OF THE INVENTION

Accordingly, the object is achieved by providing a quick-release apparatus for a knife plate of a saw grinding machine; the quick-release apparatus comprises a fixture plate, a fastening member and a control member. The control member is adapted to selectively abut against the fastening member for tightingly attaching to the knife plate as to quick-release the knife plate from the fixture plate. An adjusting element of the fixture plate is engaged with a first projection formed on a side of the fixture plate in a screw manner for adjusting a distance between the control member and the knife plate and press-strength of the fastening member against the knife plate.

Other advantages and features of the present invention will become apparent from the following descriptions referring to the drawings.

BRIEF DESCRIPTION OF THE DRAWINGS

The present invention will be described through detailed illustration of three embodiments referring to the drawings.

DETAILED DESCRIPTION OF THE PREFERRED EMBODIMENT

Figure 1:
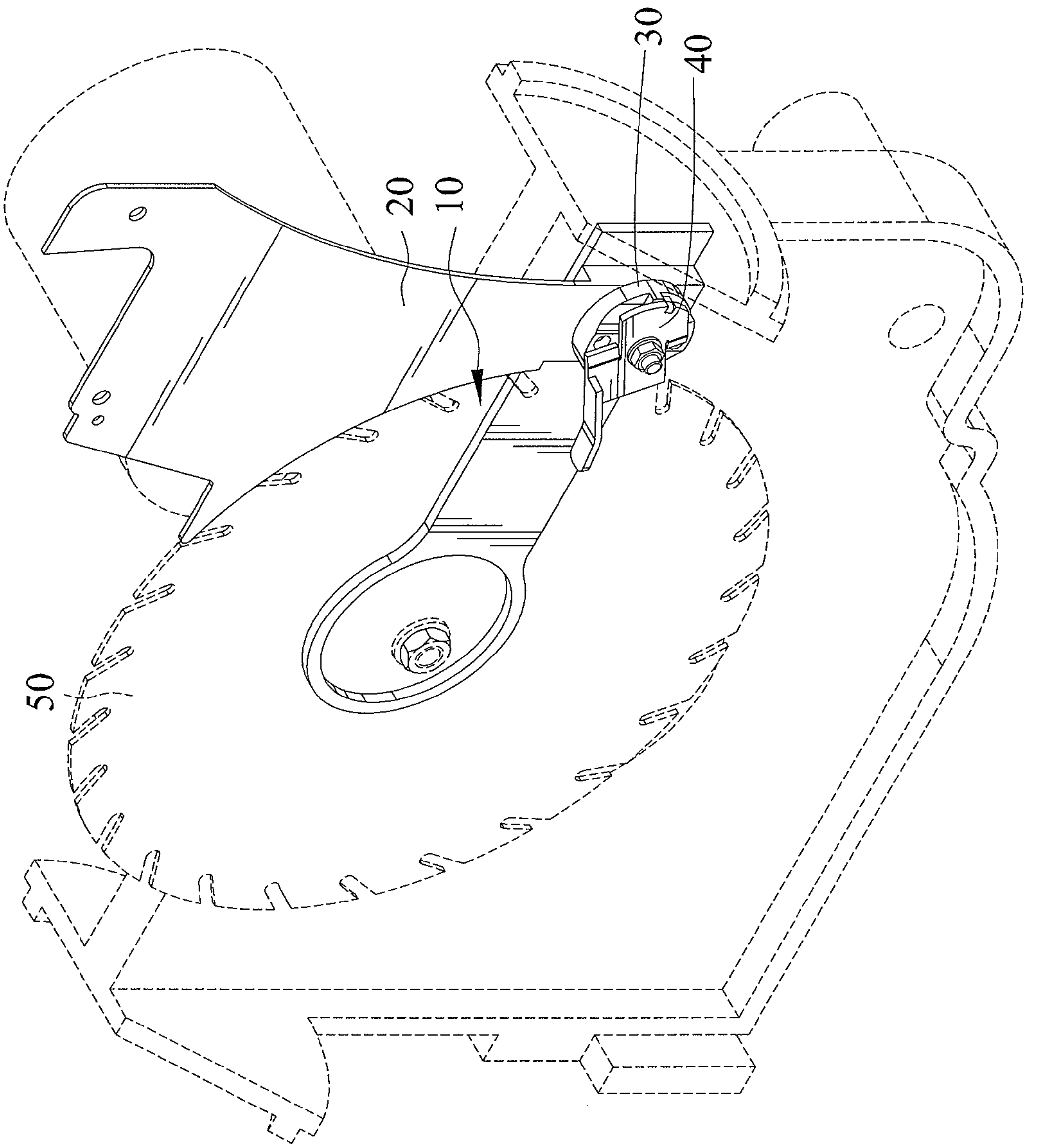
FIG. 1 is a perspective view of a quick-release apparatus for a knife plate of a saw grinding machine according to the preferred embodiment of the present invention.
Figure 2:
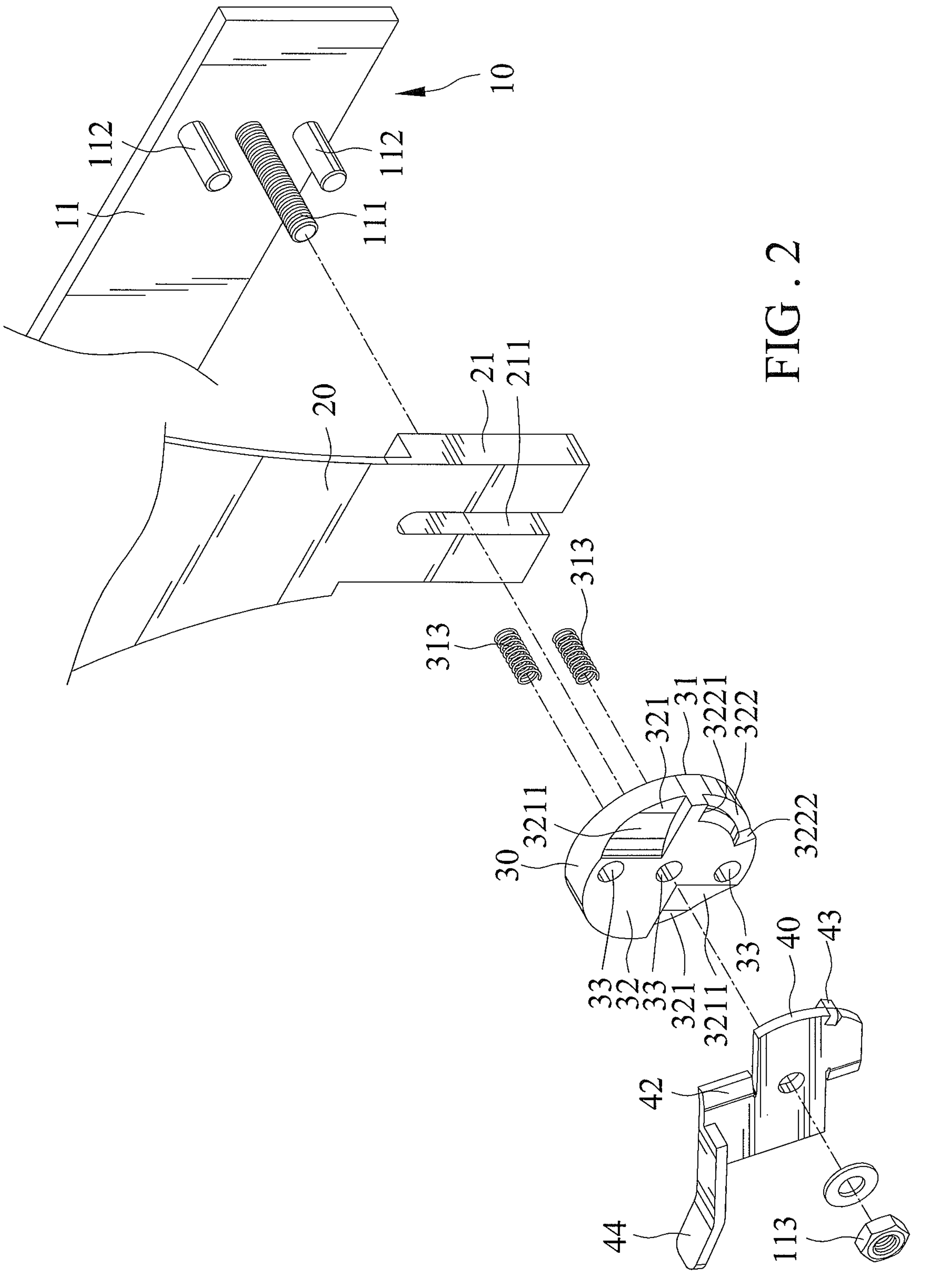
FIG. 2 is an exploded view of the quick-release apparatus shown in FIG. 1.
Figure 3:
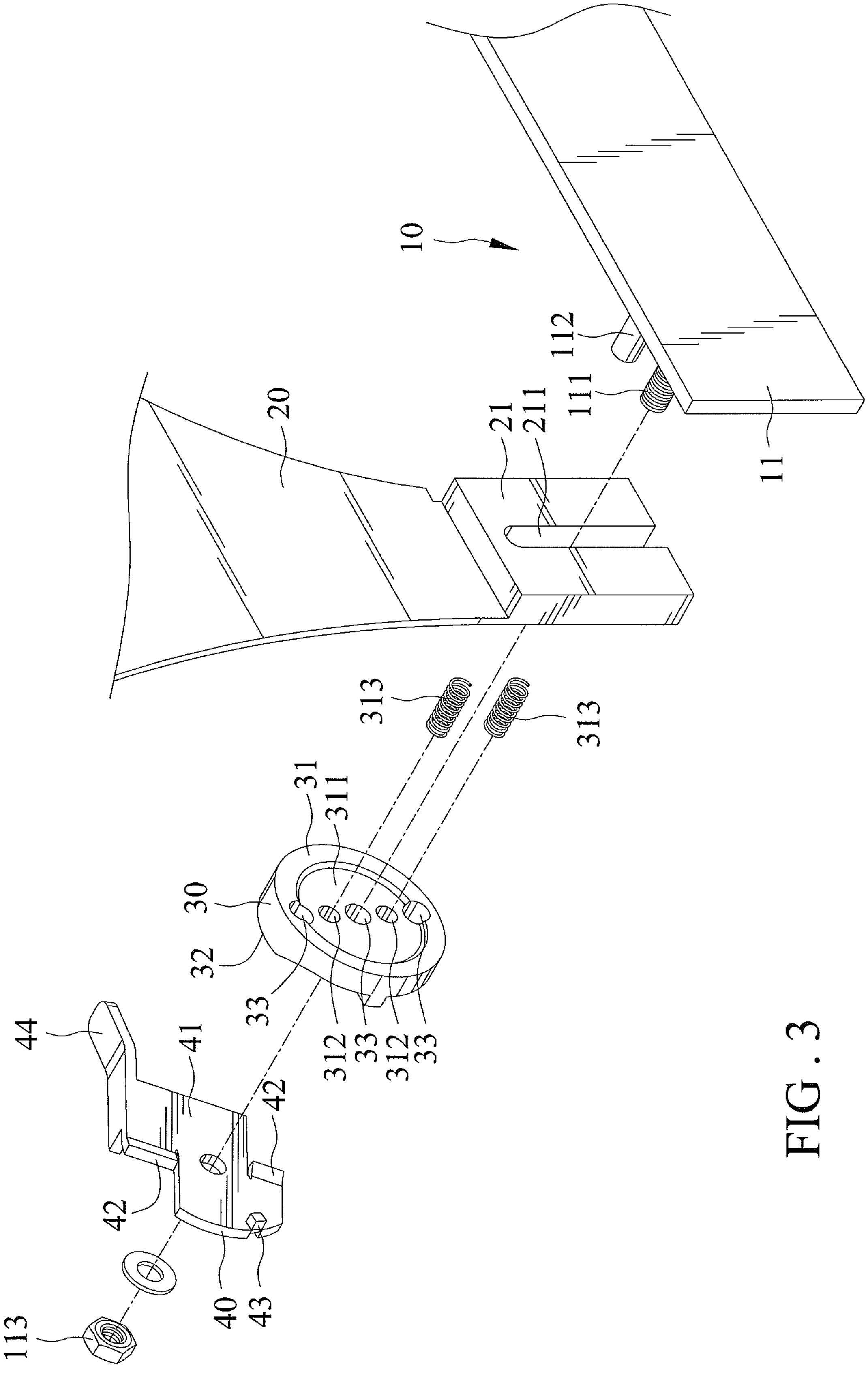
FIG. 3 is another exploded view of the quick-release apparatus shown in FIG. 1.
Figure 4:
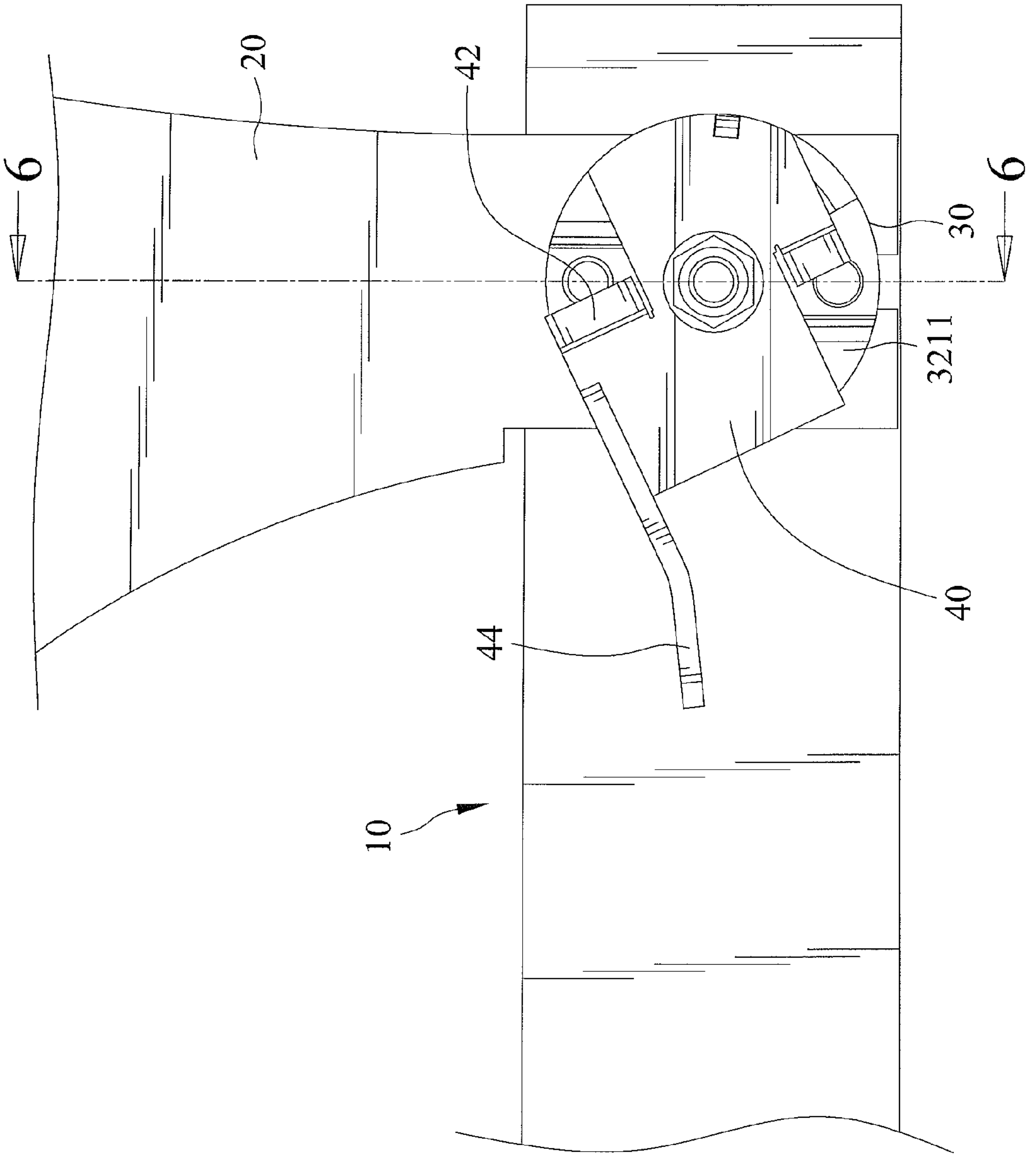
FIG. 4 is a front view of the quick-release apparatus shown in FIG. 1.
Figure 5:
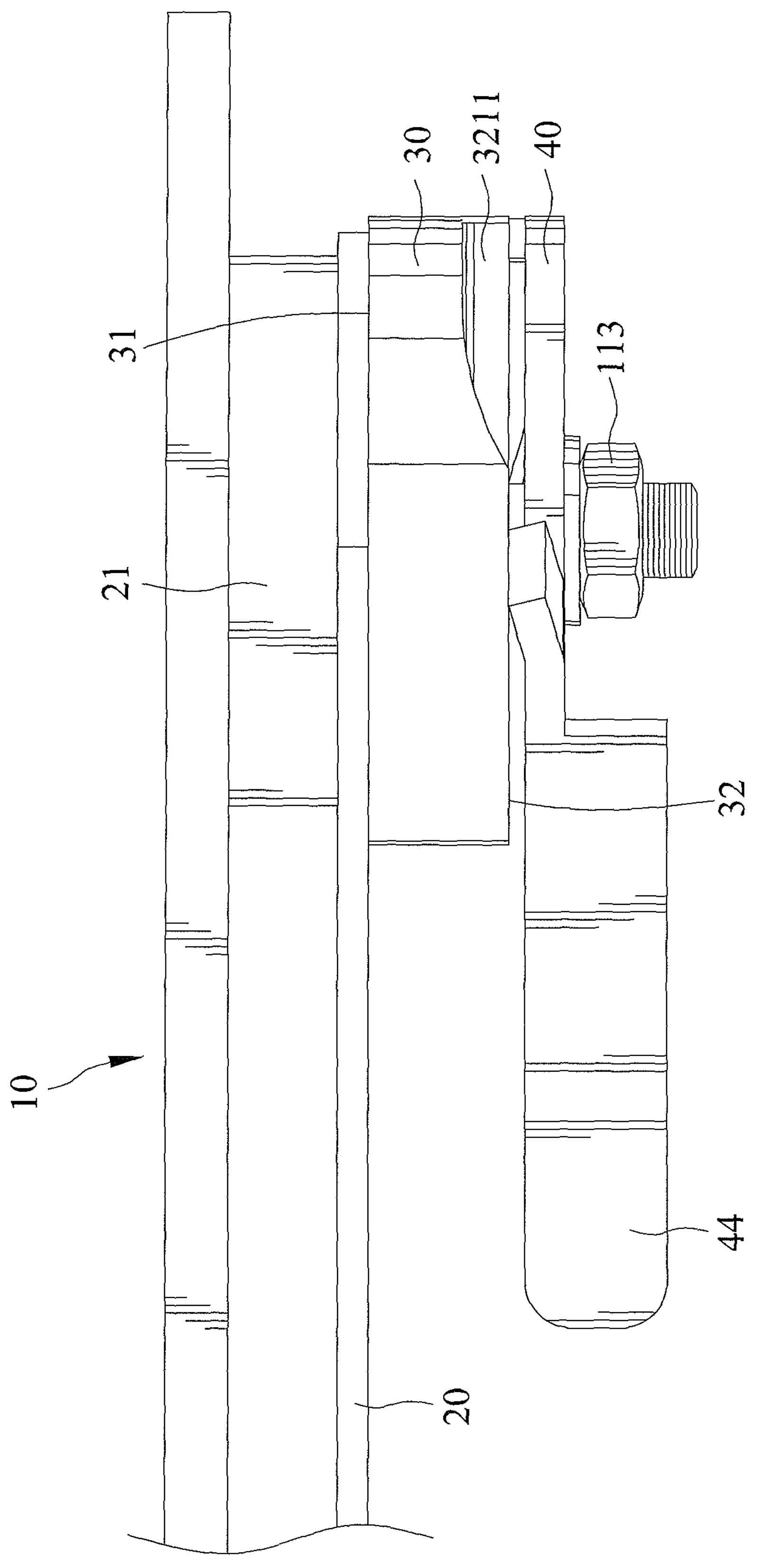
FIG. 5 is a top view of the quick-release apparatus shown in FIG. 1.
Figure 6:
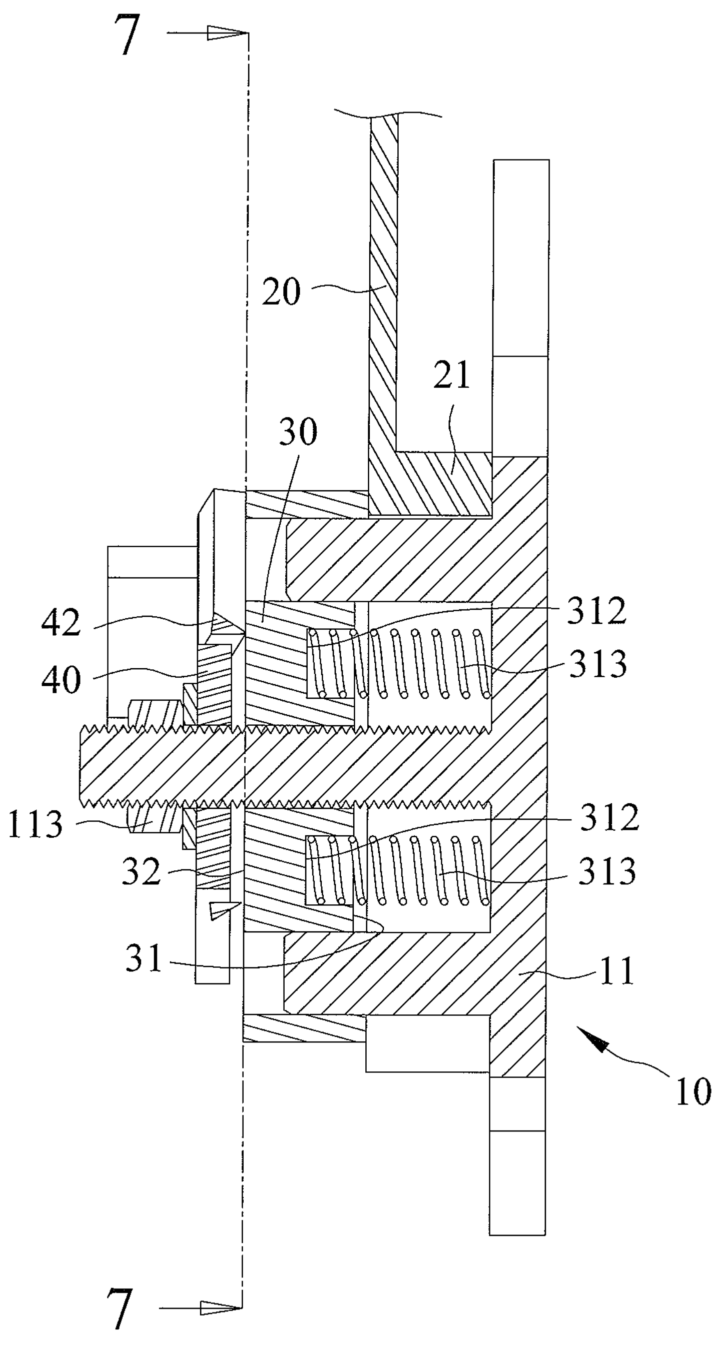
FIG. 6 is a cross-sectional view taken along 6-6 in FIG. 4.
Figure 7:
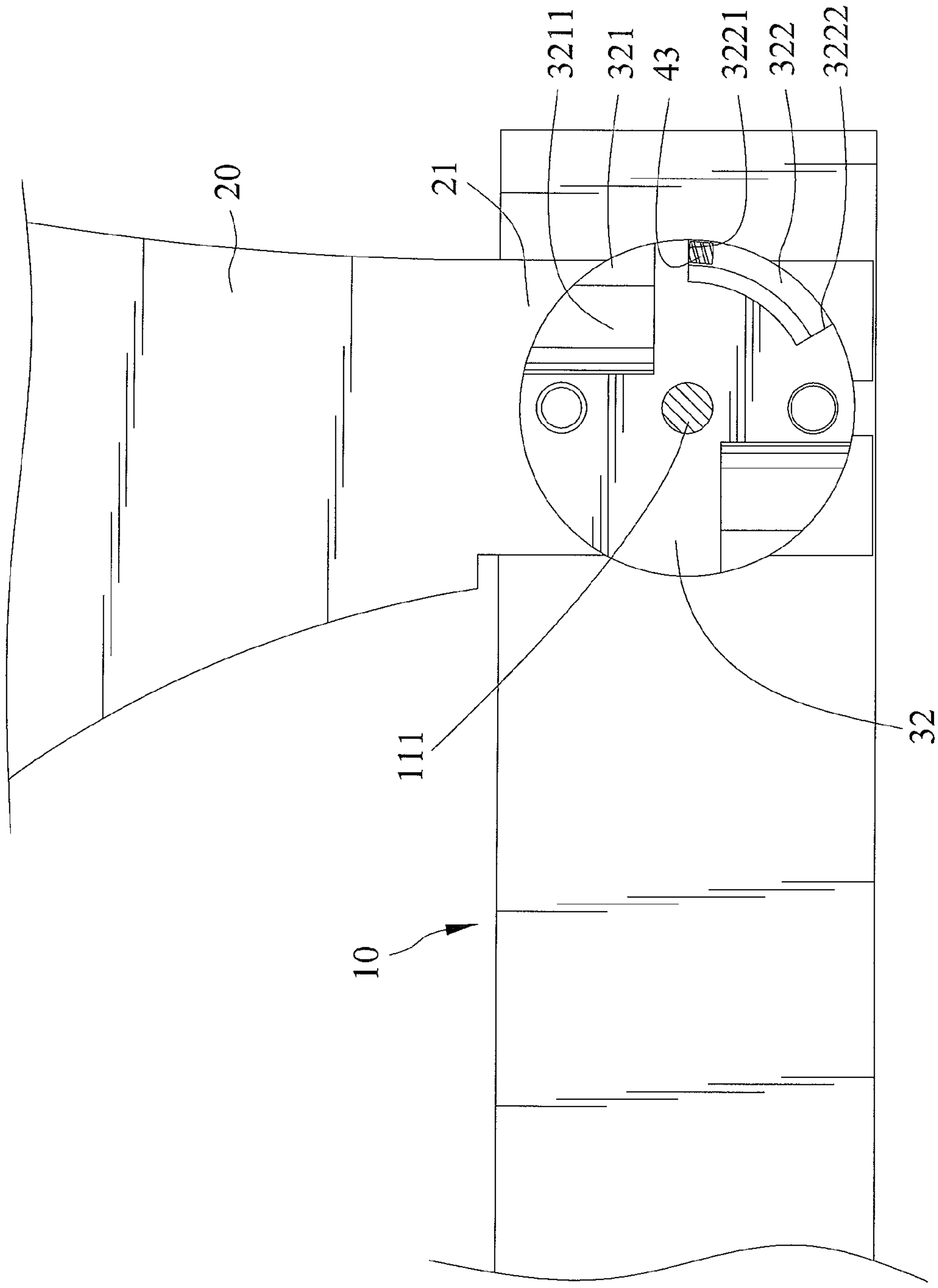
FIG. 7 is a cross-sectional view taken along 7-7 in FIG. 6.

With reference to FIGS. 1 through 13, they show that a quick-release apparatus for a knife plate 20 of a saw grinding machine. The quick-release apparatus includes a fixture plate 10, a fastening member 30 and a control member 40.

A coupled portion 11 is defined at an end of the fixture plate 10 and a saw blade 50 of the saw grinding machine is connected to another end of the fixture plate 10. A first projection 111, two second projections 112 and an adjusting element 113 are formed on a side of the coupled portion 11. The first projection 111 is disposed between the second projections 112 and has outer threads on the periphery thereof. The first and second projections 111 and 112 are located in the same vertical line on the coupled portion 11. A length of each second projection 112 is smaller than that of the first projection 111. The adjusting element 113 is able to engage with the first projection 111 in a screw manner.

The knife plate 20 includes a coupled portion 21 having a slot 211 which is able to hook the first and second projections 111 and 112 of the fixture plate 10. The coupled portion 21 of the knife plate 20 has a thickness that is smaller than the length of the first projection 111 and the length of each second projection 112.

The fastening member 30 has an interior side 31, an exterior side 32 and three through-holes 33 piercing therethrough from the interior side 31 to the exterior side 32. The three through-holes 33 are located in the same line and respectively mounted on the first and second projections 111 and 112 of the fixture plate 10 as to prevent the fastening member 30 from rotating with respect to the first projection 111 of the fixture plate 10.

The interior side 31 of the fastening member 30 is able to abut against the knife plate 20 and forms with a recess 311. An outer periphery of the recess 311 is abutted with the knife plate 20 annularly. Two apertures 312 are formed on the interior side 31 and respectively disposed between two of the through-holes 33. The apertures 312 and the through-holes 33 are located in the same line. An elastic element 313 is provided in each aperture 312 and has a first end abutted against the fixture plate 10 and a second end abutted against the related aperture 312 so that the elastic element 313 is adapted to press the fastening member 30 to detach from the knife plate 20.

The exterior side 32 includes two opposite concaved portions 321 and a limited slot 322 formed thereon. A guiding inclined surface 3211 is formed between the exterior side 32 and each concaved portion 321 and the limited slot 322 has a first section 3221 and a second section 3222.

The control member 40, which is mounted on the first projection 111 of the fixture plate 10 and able to rotate with respect to the fastening member 30, includes an abutted side 41 facing the fastening member 30, two opposite protruding portions 42 formed on the abutted side 41 and respectively corresponding to and coupled to the concaved portions 321 of the fastening member 30, a sliding portion 43 restricted to slide in the limited slot 322 of the fastening member 30 between the first and second sections 3221 and 3222 and an operating portion 43 operated by users so that the protruding portion 42 is able to selectively abut with the fastening member 30 for tightingly attaching the knife plate 20.

The adjusting element 113 of the fixture plate 10 engages with a distal end of the first projection 111 in a screw manner to adjust a distance between the control member 40 and the knife plate 20 and press-strength of the fastening member 30 against the knife plate 20.

Particularly referring to FIGS. 4 through 7, while the protruding portion 42 of the control member 40 is abutted against the exterior side 32 of the fastening member 30, the elastic elements 313 are pressed by the fastening member 30 and the control member 40 presses the fastening member 30 to abut with the knife plate 20. And then, the knife plate 20 is tightingly attached to the fixture plate 10 and the sliding portion 43 of the control member 40 is disposed in the first section 3221 of the limited slot 322.

Figure 8:
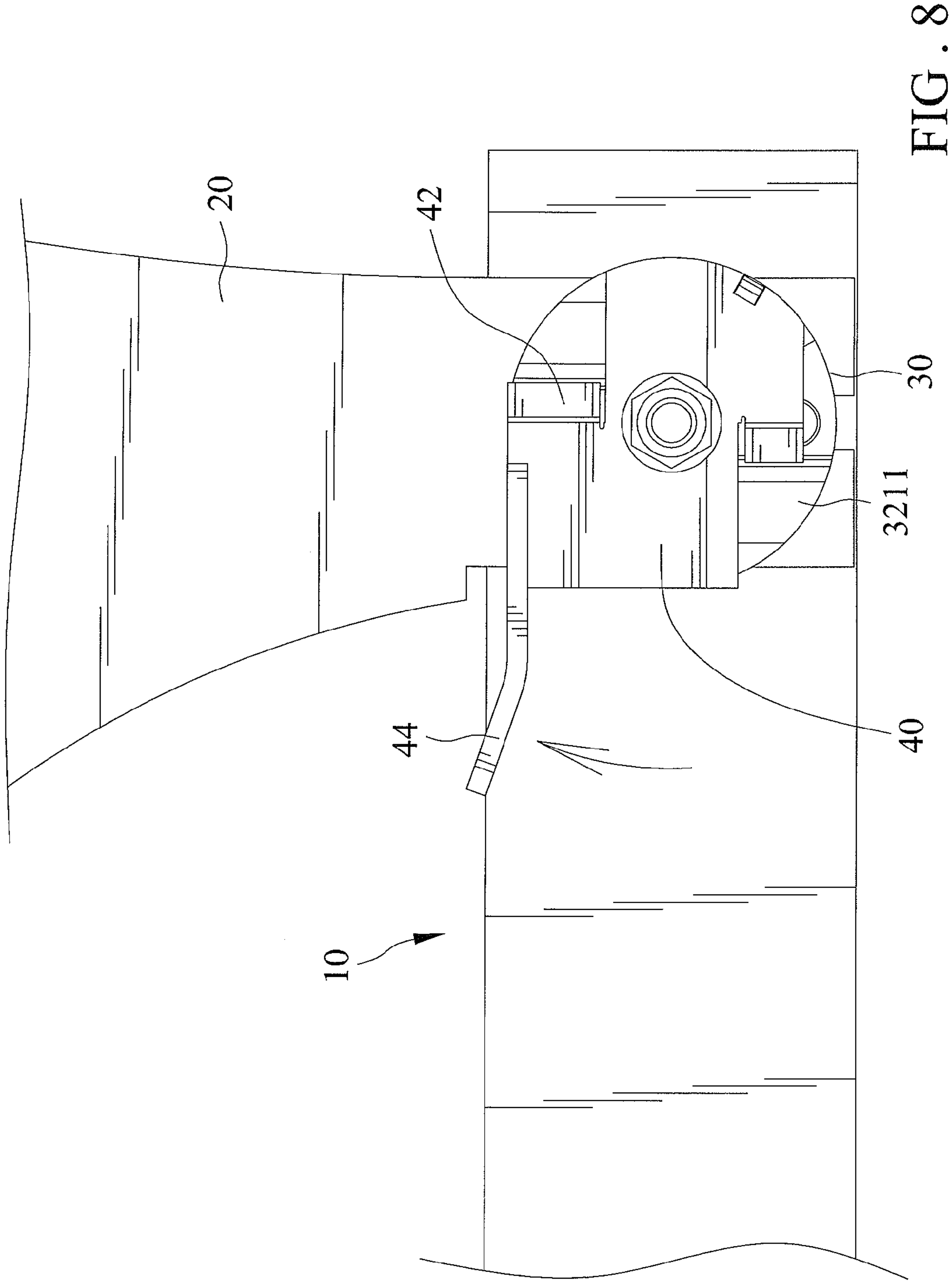
FIG. 8 is a cross-sectional view of the quick-release apparatus similar to FIG. 7, illustrating that the operating portion is operated to pivot the control member.
Figure 9:
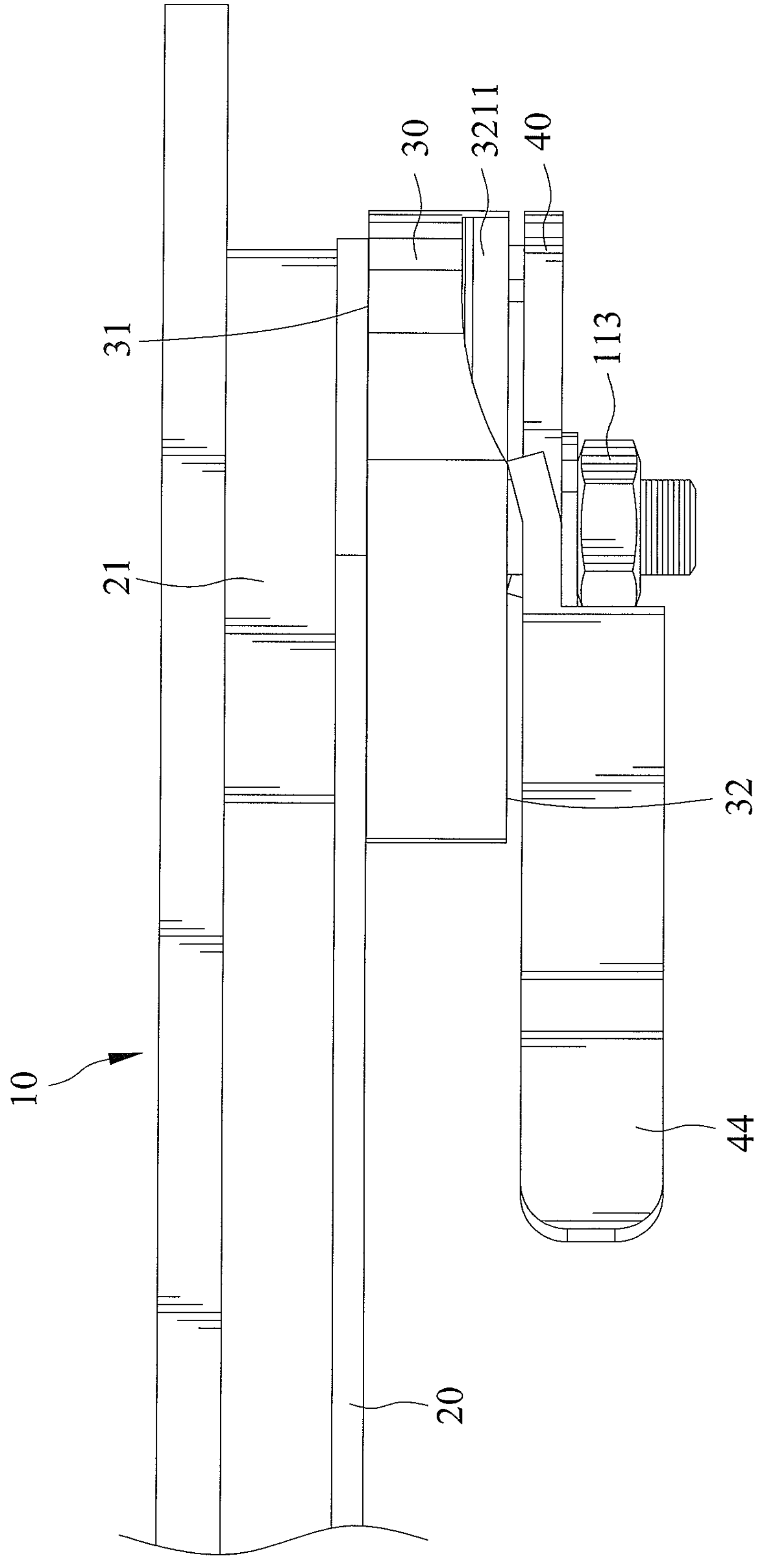
FIG. 9 is a top view similar of the quick-release apparatus to FIG. 5, illustrating the protruding portion in contact with the guiding inclined surface.
Figure 10:
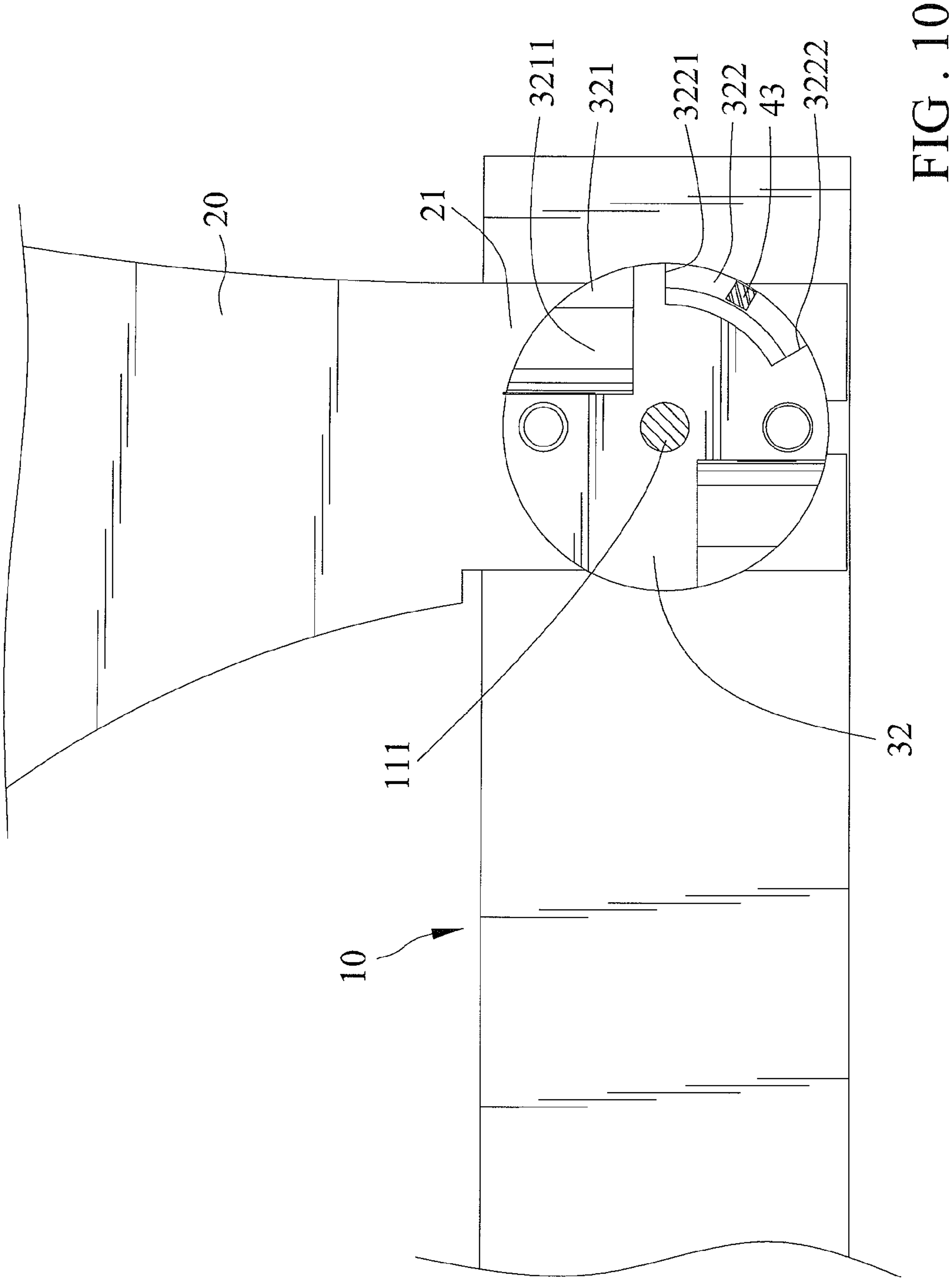
FIG. 10 is a cross-sectional view of the quick-release apparatus similar to FIG. 7, illustrating the sliding portion being between two sections of the limited slot.

Particularly referring to FIGS. 8 through 10, they show that the operating portion 44 is operated to pivot with respect to the first projection 111 of the fixture plate 10. While the protruding portion 42 of the control member 40 is in contact with the guiding inclined surface 3211 of the fastening member 30, the sliding portion 43 is disposed between the first and second sections 3221 and 3222 of the limited slot 322. And then, the protruding portion 42 of the control member 40 is guided to slide into the selected one of the concaved portions 321.

Figure 11:
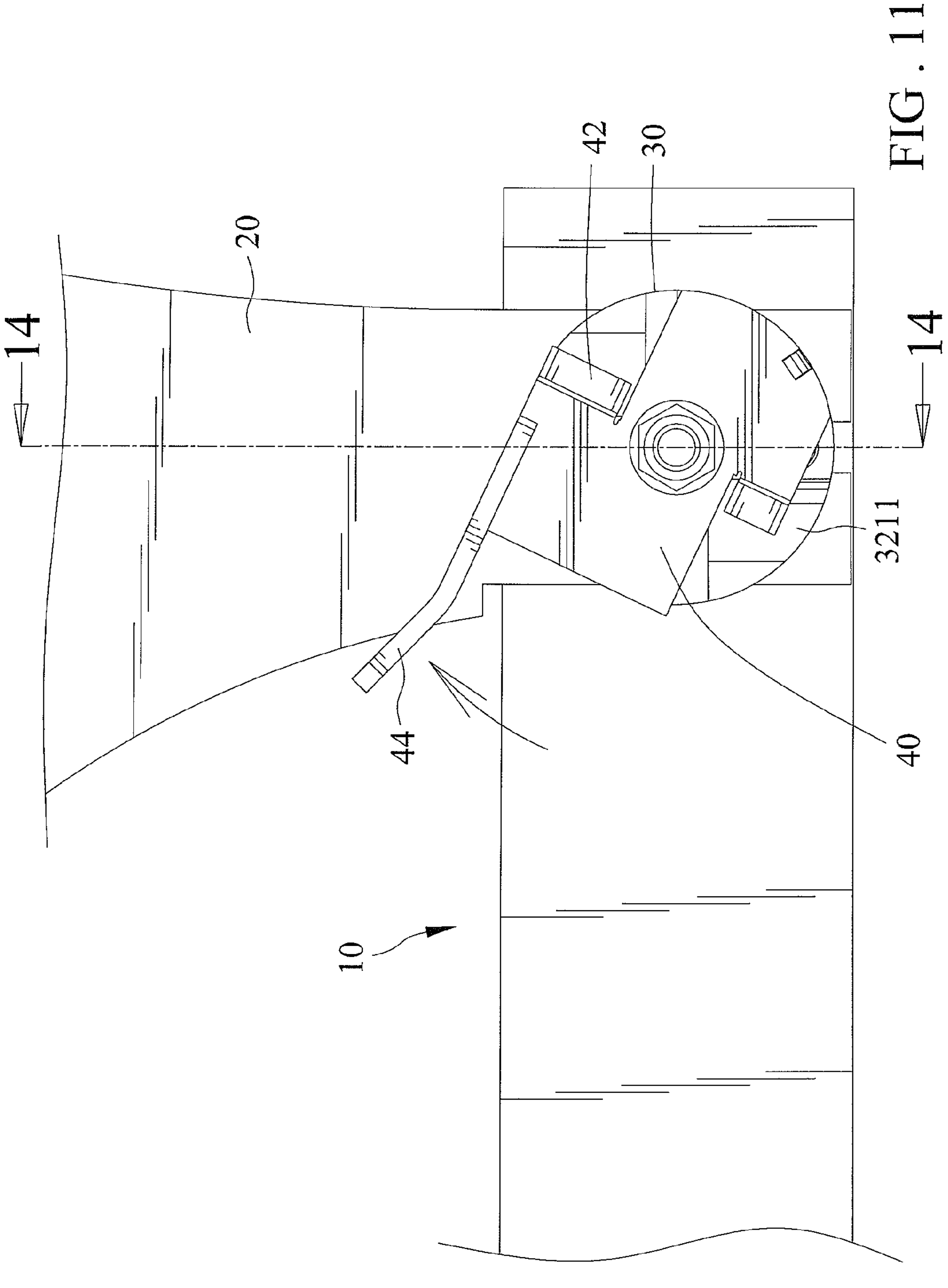
FIG. 11 is a cross-sectional view of the quick-release apparatus similar to FIG. 10, illustrating the operating portion continuing pressing the control member.
Figure 12:
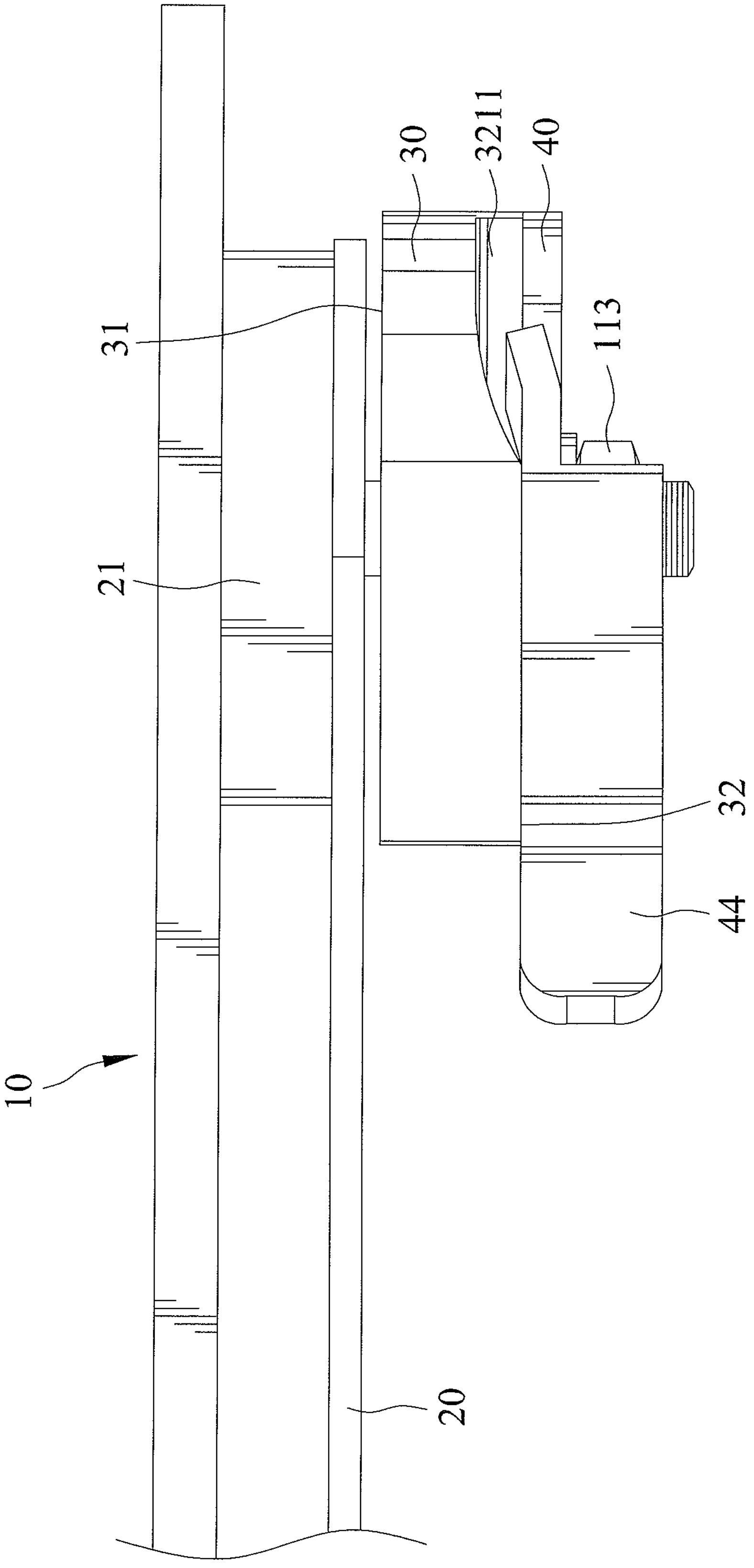
FIG. 12 is a top view of the quick-release apparatus similar to FIG. 9, illustrating the abutted surface abutted against the exterior side of the fastening member.
Figure 13:
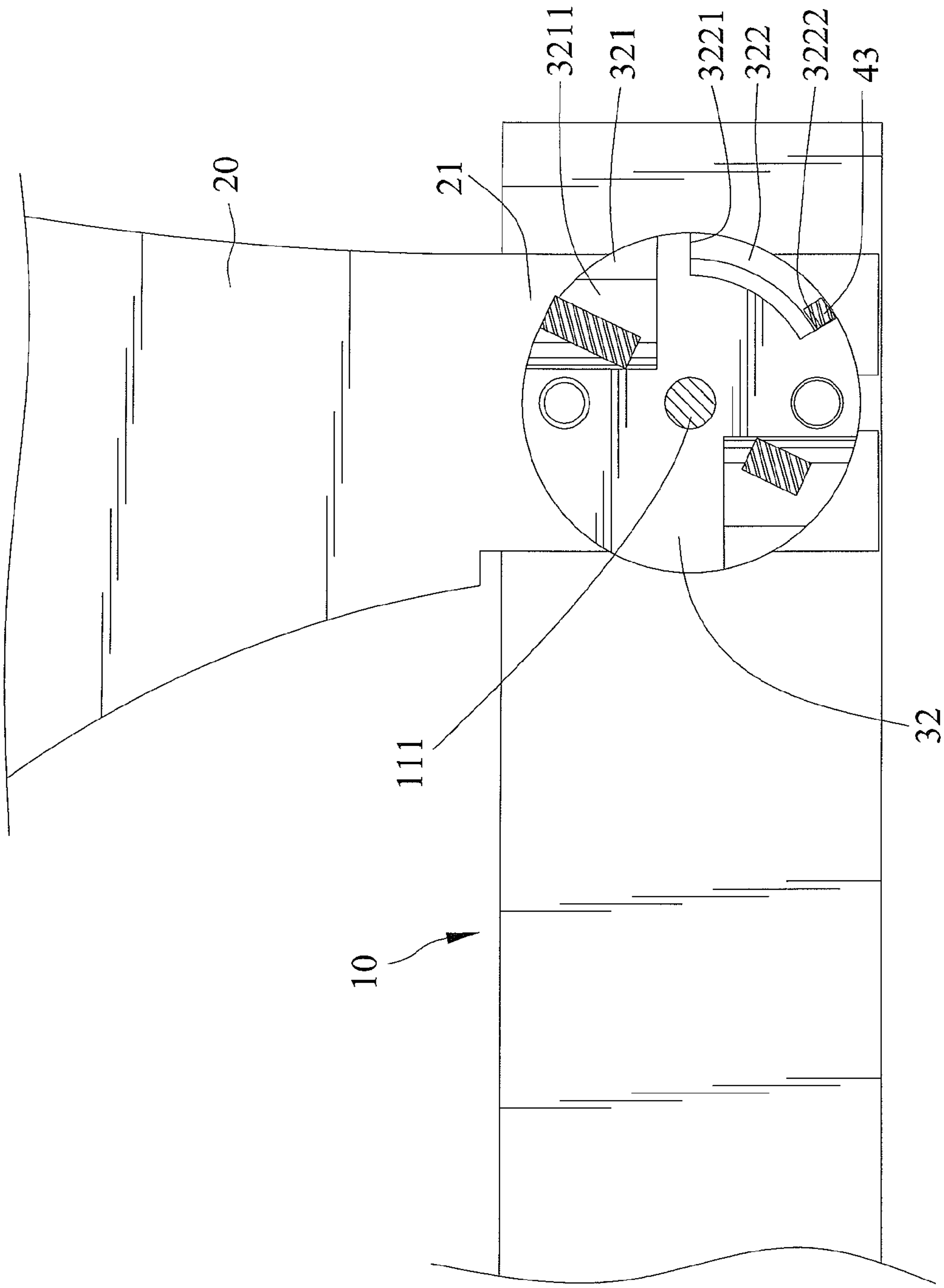
FIG. 13 is a cross-sectional view of the quick-release apparatus similar to FIG. 10, illustrating the sliding portion disposed at the second section of the limited slot.
Figure 14:
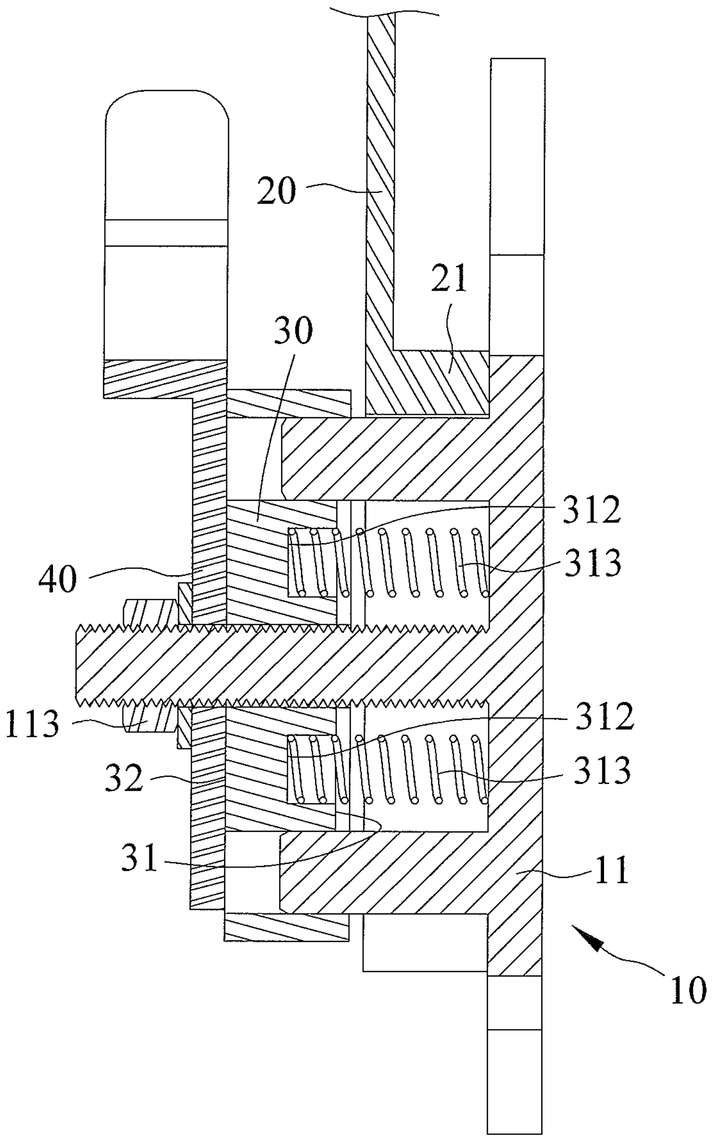
FIG. 14 is a cross-sectional view taken along 14-14 in FIG. 11.
Figure 15:
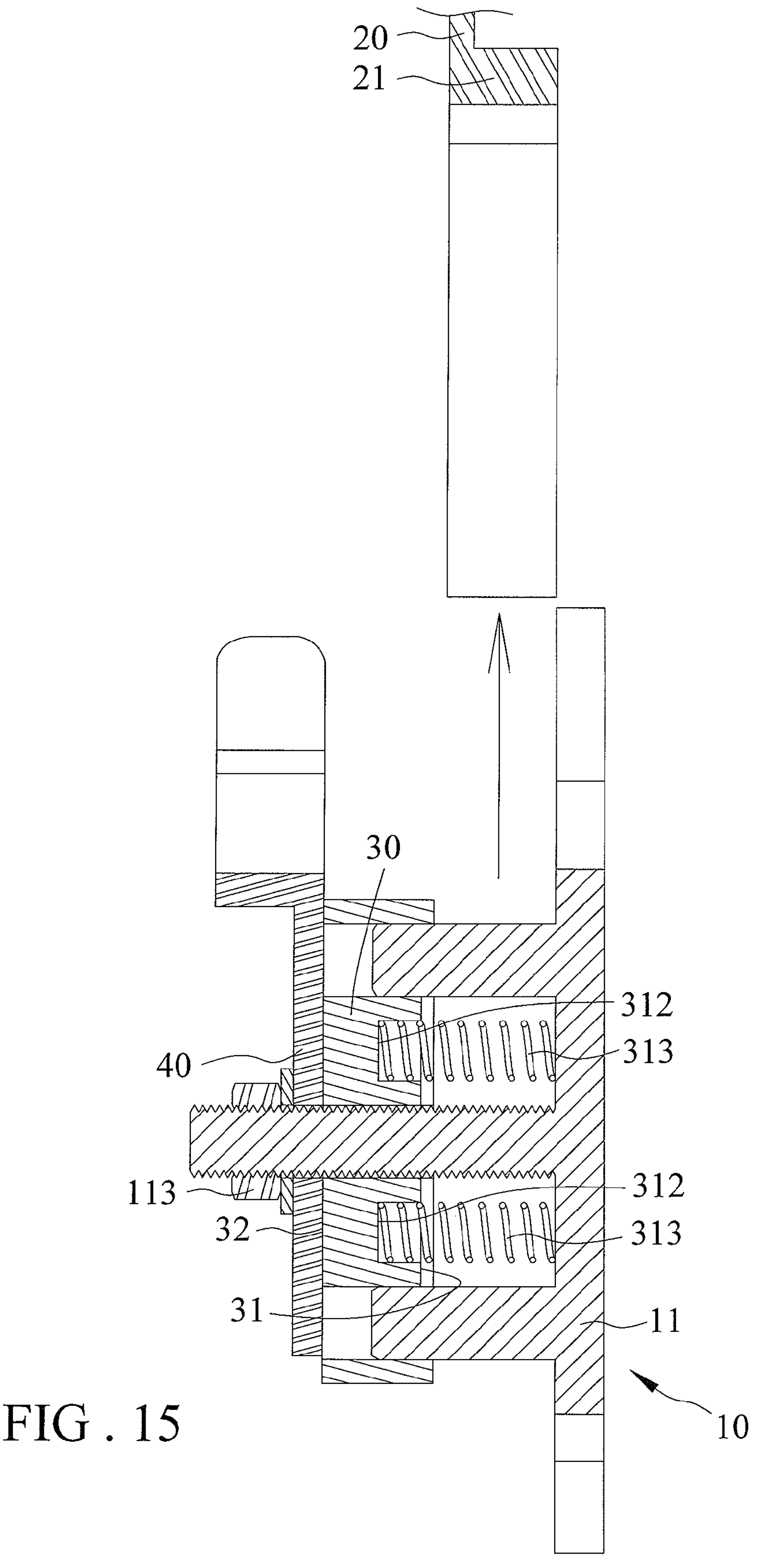
FIG. 15 is a cross-sectional view of the quick-release apparatus similar to FIG. 14, illustrating that the knife plate is able to detach from the fixture plate.

Particularly referring to FIGS. 11 through 13, they shows that the protruding portion 42 of the control member 40 slides to the exterior side 32 where the abutted side 41 is abutted, and the sliding portion 43 is disposed at the second section 3222 of the limited slot 322. Further referring to FIGS. 14 and 15, in the meanwhile, the fixture plate 30 is detached from and not presses the knife plate 20 and the knife plate 20 enables to detach from the first and second projections 111 and 112 of the coupled portion 11 of the fixture plate 10.

While several embodiments of the invention have been shown and described, it will be apparent to those skilled in the art that modifications may be made therein without departing from the scope and spirit of the present invention.

What is claimed is:

1. A quick-release apparatus in combination with a knife plate of a saw grinding machine, the quick-release apparatus combination comprising:

a fixture plate with a first projection, said fixture plate being fixed to a saw grinding machine; said first projection including screw threading at least at a distal end thereof; said fixture plate including at least one second projection to prevent rotation of at least one of a knife plate or a fastening member;

wherein the knife plate includes a coupled portion having a slot to engage the first projection of the fixture plate;

said fastening member mounted onto and not pivotable with respect to the first projection of the fixture plate, wherein the fastening member has an interior side directed towards the knife plate and the fixture plate and including an exterior side having at least one concaved portion; and a control member pivotably connected to the fastening member and including an abutted side and at least one protruding portion formed on the abutted side, with the abutted side and the at least one protruding portion both corresponding to the at least one concaved portion, with the abutted side facing the exterior side of the fastening member, and with the at least one protruding portion selectively pressing the exterior side of the fastening member to attach to the knife plate;

the fastening member further comprising a limited slot formed on the exterior side thereof; wherein the control member includes a sliding portion limited to slide in the limited slot of the fastening member.

2. The quick-release apparatus combination as claimed in claim 1 wherein said limited slot formed on the exterior side of the fastening member includes a first section and a second section; said fastening member includes an operating portion configured for engagement by users.

3. The quick-release apparatus combination as claimed in claim 1 further comprising a guiding inclined surface between the exterior side and each concaved portion; wherein the control member is guided to slide to abut against the exterior side of the fastening member by contact between the protruding portion of the control member and the guiding inclined surface.

4. The quick-release apparatus combination as claimed in claim 2 further comprising a guiding inclined surface between the exterior side and each concaved portion; wherein the control member is guided to slide to abut against the exterior side of the fastening member by contact between the protruding portion of the control member and the guiding inclined surface.

5. The quick-release apparatus combination as claimed in claim 1 further comprising numbers of second projections formed on the side of the fixture plate, with the second projections and the first projection being in the same line and hooking the slot of the knife plate.

6. The quick-release apparatus combination as claimed in claim 5 wherein the fixture plate further comprises an interior side opposite to the exterior side and numbers of through-holes piercing therethrough and corresponding to and mounted on the first and second projections, with the first projection inserted through the control member.

7. The quick-release apparatus combination as claimed in claim 6 further comprising numbers of elastic elements corresponding to the slot of knife plate.

8. The quick-release apparatus combination as claimed in claim 7 further comprising numbers of apertures formed on the interior side of the fastening member and provided between each aperture and the fixture plate.

9. The quick-release apparatus combination as claimed in claim 8 wherein each aperture is provided between two of the through-holes.

10. The quick-release apparatus combination as claimed in claim 5 wherein the coupled portion of the knife plate has a thickness that is smaller than a length of the first projection and a length of each second projection.

11. The quick-release apparatus combination as claimed in claim 1 further comprising an adjusting element engaged with a distal end of the first projection in a screw manner to adjust a distance between the control member and the knife plate and press-strength of the fastening member against the knife plate.

* * * * *